US 11,310,544 B2

United States Patent
Smith et al.

(10) Patent No.: US 11,310,544 B2
(45) Date of Patent: *Apr. 19, 2022

(54) SYSTEMS AND METHODS FOR PLAYOUT OF FRAGMENTED VIDEO CONTENT

(71) Applicant: Imagine Communications Corp., Plano, TX (US)

(72) Inventors: Stephen Smith, Parker, CO (US); Yuval Fisher, Palo Alto, CA (US); Brick Eksten, Uxbridge (CA); Steven Reynolds, Littleton, CO (US)

(73) Assignee: IMAGINE COMMUNICATIONS CORP., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/216,380

(22) Filed: Mar. 29, 2021

(65) Prior Publication Data
US 2021/0219005 A1    Jul. 15, 2021

Related U.S. Application Data

(63) Continuation of application No. 16/131,890, filed on Sep. 14, 2018, now Pat. No. 10,999,611.
(Continued)

(51) Int. Cl.
*H04N 21/236* (2011.01)
*H04N 21/2343* (2011.01)
(Continued)

(52) U.S. Cl.
CPC ... *H04N 21/23608* (2013.01); *H04N 21/2343* (2013.01); *H04N 21/23439* (2013.01); *H04N 21/26258* (2013.01); *H04N 21/8456* (2013.01)

(58) Field of Classification Search
CPC ......... H04N 21/23608; H04N 21/2343; H04N 21/23439; H04N 21/26258; H04N 21/8456
See application file for complete search history.

(56) References Cited

U.S. PATENT DOCUMENTS

| 2004/0070690 A1 | 4/2004 | Holtz et al. |
| 2011/0126248 A1 | 5/2011 | Fisher et al. |

(Continued)

FOREIGN PATENT DOCUMENTS

EP    2779658 A2    9/2014

OTHER PUBLICATIONS

Extended European Search Report for EP Appl. No. 18856176.5 dated Dec. 17, 2020, 7 pages.
(Continued)

*Primary Examiner* — Jefferey F Harold
*Assistant Examiner* — Alexander Boyd
(74) *Attorney, Agent, or Firm* — Norton Rose Fulbright US LLP

(57) ABSTRACT

A playout system for providing playout of fragmented video content is provided. The system includes a non-transitory data store and a processor. The processor is configured to playout content for video origination using a fragmented format. The processor can receive a playlist and generate a plurality of video fragments from source content. A transcoder can process video fragments based on one or more program scheduling requirements from the playlist to generate new video fragments. A manifest is updated to reference the new video fragments. The process can output a video stream based on the new video fragments.

20 Claims, 5 Drawing Sheets

| Content Stream | Fragment 1 | Fragment 2 | Fragment 3 | Fragment 4 | Fragment 5 | Fragment 6 |
|---|---|---|---|---|---|---|
| National Content | National Fragment | National Fragment | National Fragment | National Fragment | National Fragment | National Fragment |
| Region 1 Content | National Fragment | Regional Fragment | Regional Fragment | National Fragment | National Fragment | National Fragment |
| Region 2 Content | National Fragment | National Fragment | Regional Fragment | Regional Fragment | Regional Fragment | National Fragment |
| Region 3 Content | National Fragment | National Fragment | Regional Fragment | Regional Fragment | Regional Fragment | National Fragment |
| Region 4 Content | National Fragment | Regional Fragment | Regional Fragment | National Fragment | National Fragment | National Fragment |
| Region 5 Content | National Fragment | National Fragment | National Fragment | National Fragment | National Fragment | National Fragment |

Related U.S. Application Data

(60) Provisional application No. 62/559,058, filed on Sep. 15, 2017.

(51) Int. Cl.
*H04N 21/845* (2011.01)
*H04N 21/262* (2011.01)

(56) References Cited

U.S. PATENT DOCUMENTS

| | | |
|---|---|---|
| 2013/0151493 A1 | 6/2013 | Roth et al. |
| 2014/0344852 A1 | 11/2014 | Reisner et al. |
| 2016/0191961 A1 | 6/2016 | Fisher et al. |
| 2016/0192029 A1 | 6/2016 | Bergstrom |
| 2016/0308958 A1 | 10/2016 | Navali et al. |
| 2017/0195744 A1 | 7/2017 | Engel et al. |
| 2017/0289597 A1* | 10/2017 | Riedel .............. H04N 21/25875 |
| 2017/0289639 A1 | 10/2017 | Reisner |
| 2017/0332114 A1* | 11/2017 | Turgut ............... H04N 21/2665 |
| 2017/0359628 A1* | 12/2017 | Sachdev .............. H04N 21/435 |
| 2018/0192079 A1 | 7/2018 | Riedl et al. |
| 2019/0068665 A1 | 2/2019 | Kieft et al. |
| 2019/0110096 A1 | 4/2019 | Shaw et al. |
| 2019/0327505 A1 | 10/2019 | Schwimmer et al. |

OTHER PUBLICATIONS

PCT/ISA, Written Opinion and International Search Report for International Application No. PCT/CA2018/051143 dated Oct. 30, 2018.

* cited by examiner

| Content Stream | Fragment 1 | Fragment 2 | Fragment 3 | Fragment 4 | Fragment 5 | Fragment 6 |
|---|---|---|---|---|---|---|
| National Content | National Fragment | National Fragment | National Fragment | National Fragment | National Fragment | National Fragment |
| Region 1 Content | National Fragment | Regional Fragment | Regional Fragment | National Fragment | National Fragment | National Fragment |
| Region 2 Content | National Fragment | National Fragment | Regional Fragment | Regional Fragment | Regional Fragment | National Fragment |
| Region 3 Content | National Fragment | National Fragment | Regional Fragment | Regional Fragment | Regional Fragment | National Fragment |
| Region 4 Content | National Fragment | Regional Fragment | Regional Fragment | National Fragment | National Fragment | National Fragment |
| Region 5 Content | National Fragment | National Fragment | National Fragment | National Fragment | National Fragment | National Fragment |

FIG. 4

SYSTEMS AND METHODS FOR PLAYOUT OF FRAGMENTED VIDEO CONTENT

CROSS-REFERENCE TO RELATED APPLICATIONS

The present application is a continuation of U.S. patent application Ser. No. 16/131,890 filed Sep. 14, 2018, and entitled "SYSTEMS AND METHODS FOR PLAYOUT OF FRAGMENTED VIDEO CONTENT," which claims the benefit of U.S. Provisional Patent Application No. 62/559,058, filed Sep. 15, 2017, the disclosures of which are hereby incorporated by reference in their entirety.

FIELD

Embodiments generally relate to the field of processing, managing and streaming video content. More specifically, embodiments relate to systems and methods for playout of fragmented video content.

INTRODUCTION

Video experiences delivered over the air, via satellite and over the cable systems can be delivered as a continuous stream of content that is encoded, transmitted and decoded with very strict cadence. The cadence of the delivery may be tied to a frame/field rate of the content, and processing of the content at almost every stage of its life needs to be done in real-time or near real-time, that is, in accordance with a specific frame rate. For example, video with a frame rate of 25 frames per second requires processing components that handle the video to be able to render, deliver or otherwise complete operation on a single frame of video within 40 ms (1000 ms/25 frames=40 ms/frame).

SUMMARY

In an aspect, embodiments described herein provide a computer-processor-implemented playout system for providing playout of fragmented video content for video origination. The system has a processor configured to: receive a playlist and source content, the playlist indicating a playout sequence and one or more program scheduling requirements; convert, via a transcoder, the source content into a plurality of video fragments, each fragment being a separately managed unit of content; process, via the transcoder, one or more of the plurality of video fragments based on the playlist to generate processed video fragments; generate a fragmented-video manifest based on the processed video fragments, the fragmented-video manifest containing timing data and location data for the processed video fragments to generate a video stream suitable for origination, the location data indicating a storage location of the processed video fragments, the timing data indicating a sequence of the processed video fragments; and output the fragmented-video manifest for generation of the video stream using the processed video fragments. The system can store the processed video fragments at a data store, for example.

In some embodiments, the processor is configured to process another set of one or more of the plurality of video fragments, generate another fragmented-video manifest, and output the other set of video fragments being different than the initial set of video fragments.

In some embodiments, the processor is configured to process a first set of video fragments using a first processing technique and a second set of video fragments using a second processing technique.

In some embodiments, the processor is configured to process the one or more of the plurality of video fragments by adding overlays to the video fragments.

In some embodiments, the timing data of the fragmented-video manifest provides a timing reference for the plurality of video fragments, wherein the timing reference indicates a temporal boundary of processing for at least one of the plurality of video fragments.

In some embodiments, the processor is configured to generate the video stream using the fragmented-video manifest.

In some embodiments, the system includes a Manifest Processing Engine configured to generate the fragmented-video manifest by generating the timing data and location data corresponding to the processed video fragments.

In some embodiments, the processor is configured to store the processed video fragments and the fragmented-video manifest.

In some embodiments, the plurality of video fragments comprises one or more of a file based video fragment, a live video fragment, and a rendered video fragment.

In some embodiments, the system is connected to a delivery system configured to respond to requests for the source content using the fragmented-video manifest to request the processed video fragments.

In some embodiments, the processor is configured to identify the one or more video fragments for processing based on the one or more program scheduling requirements.

In some embodiments, the processor is configured to process a video fragment by extending, truncating or synthesizing content to align the content with an event.

In some embodiments, the video fragments are a combination of variable and consistent length fragments.

In some embodiments, the source content is a combination of live, file and augmented sources.

In some embodiments, the system is connected to an optimization engine that can manipulate the fragmented-video manifest to control resource utilization.

In an aspect, embodiments described herein provide a transcoder configured to: receive source content of one or more video files; determine one or more program scheduling requirements based on a playlist; convert the source content into a plurality of video fragments; generate new video fragments based on the one or more program scheduling requirements; transmit metadata for the new video fragments to a playout device to update a manifest to reference the processed video fragments; and output or store the new video fragments.

In some embodiments, the program scheduling requirements comprise one or more of: a graphical overlay, a composition, and a text augmentation.

In some embodiments, the transcoder has a Manifest Orchestration Engine configured to generate a new manifest representative of a program channel.

In some embodiments, the transcoder is configured to generate another set of new video fragments based on another set of program scheduling requirements, transmit new metadata for the other set of new video fragments to generate another manifest for generating a new video stream with the other set new video fragments being different than a video stream generated using the manifest and the new video segments.

In an aspect, embodiments described herein provide an overlay manager device with a processor configured to: manage pre-processing and insertion of overlays into video fragments; control a fragment transcoder to process video fragments requiring the overlays to generate new video fragments with the overlays; update a manifest with reference data for the new video fragments, the manifest for generating a video stream using the new video fragments.

In accordance with an aspect, there is provided a computer-processor-implemented playout system for providing playout of fragmented video content. The system includes a non-transitory data store and a processor. The processor may be configured to: receive a playlist and a plurality of video fragments; process, via a transcoder, one or more of the plurality of video fragments based on one or more program scheduling requirements from the playlist; and output a video stream based on the processed video fragments.

In some embodiments, the system may be configured to generate at least one new manifest, the at least one new manifest configured to provide a timing reference for the plurality of video fragments, wherein the timing reference indicates a temporal boundary of processing for at least one of the plurality of video fragment.

In some embodiments, the system may include a Manifest Processing Engine configured to generate the at least one new manifest.

In some embodiments, the system may include a Manifest Orchestration Engine configured to control one or more transcoders for converting source content into a format suitable for fragmented video delivery.

In some embodiments, the plurality of video fragments may include one or more of a file based video fragment, a live video fragment, and a rendered video fragment.

In accordance with another aspect, a transcoder is provided. The transcoder may be configured to: receive one or more video files from a source content; determine one or more program scheduling requirements based on a playlist or a manifest; and convert the one or more video files into a format suitable for fragmented video delivery, based on the one or more program scheduling requirements.

In some embodiments, the one or more video files may include video fragments.

In some embodiments, the transcoder may be configured to generate new video fragments or new video streams based on the one or more program scheduling requirements.

In some embodiments, the program scheduling requirements may include one or more of: a graphical overlay, a composition, and a text augmentation.

In some embodiments, the transcoder may be configured to include a Manifest Orchestration Engine configured to generate a new manifest representative of a program channel.

In accordance with an aspect, an overlay manager device may be provided. The overlay manager may be configured to: manage pre-processing and insertion of overlays into video fragments; and control a fragment transcoder to transcode fragments requiring the overlays.

In accordance with an aspect, there is provided a computer-processor-implemented playout system for providing playout of fragmented video content for video origination. The system has a processor configured to: receive a playlist and source content, the playlist indicating a playout sequence and one or more program scheduling requirements; convert, via a transcoder, the source content into a plurality of video fragments, each fragment being a separately managed unit of content; process, via the transcoder, one or more of the plurality of video fragments based on the playlist to generate processed video fragments; generate a fragmented-video manifest based on the processed video fragments, the fragmented-video manifest containing reference to at least a portion of the processed video fragments to generate a video stream suitable for origination; and output the fragmented-video manifest for generation of the video stream using the processed video fragments.

In some embodiments, the processor is configured to process another set of one or more of the plurality of video fragments, generate another fragmented-video manifest, and output the other set of video fragments being different than the processed video fragments for use if generating another video stream.

In some embodiments, the processor is configured to process a first set of video fragments using a first processing technique and a second set of video fragments using a second processing technique.

In some embodiments, the processor is configured to process the one or more of the plurality of video fragments by adding overlays to the video fragments.

In some embodiments, the fragmented-video manifest provides a timing reference for the plurality of video fragments, wherein the timing reference indicates a temporal boundary of processing for at least one of the plurality of video fragment.

In some embodiments, the processor is configured to generate the video stream using the fragmented-video manifest.

In some embodiments, the system includes a Manifest Processing Engine configured to generate the fragmented-video manifest by generating the timing data and location data corresponding to the processed video fragments.

In some embodiments, the processor is configured to store the processed video fragments and the fragmented-video manifest.

In some embodiments, the plurality of video fragments comprises one or more of a file based video fragment, a live video fragment, and a rendered video fragment.

In some embodiments, the system connects to a delivery system configured to respond to requests for the source content using the fragmented-video manifest to request the processed video fragments.

In some embodiments, the processor is configured to identify the one or more video fragments for processing based on the one or more program scheduling requirements.

In some embodiments, the processor is configured to process a video fragment by extending, truncating or synthesizing content to align the content with an event.

In some embodiments, the video fragments are a combination of variable and consistent length fragments.

In some embodiments, the source content is a combination of live, file and augmented sources.

In some embodiments, the system connects to an optimization engine that can manipulate the fragmented-video manifest to control resource utilization.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures:

FIG. 4 shows an example of video fragments in accordance with an embodiment.

DETAILED DESCRIPTION

Figure 1:
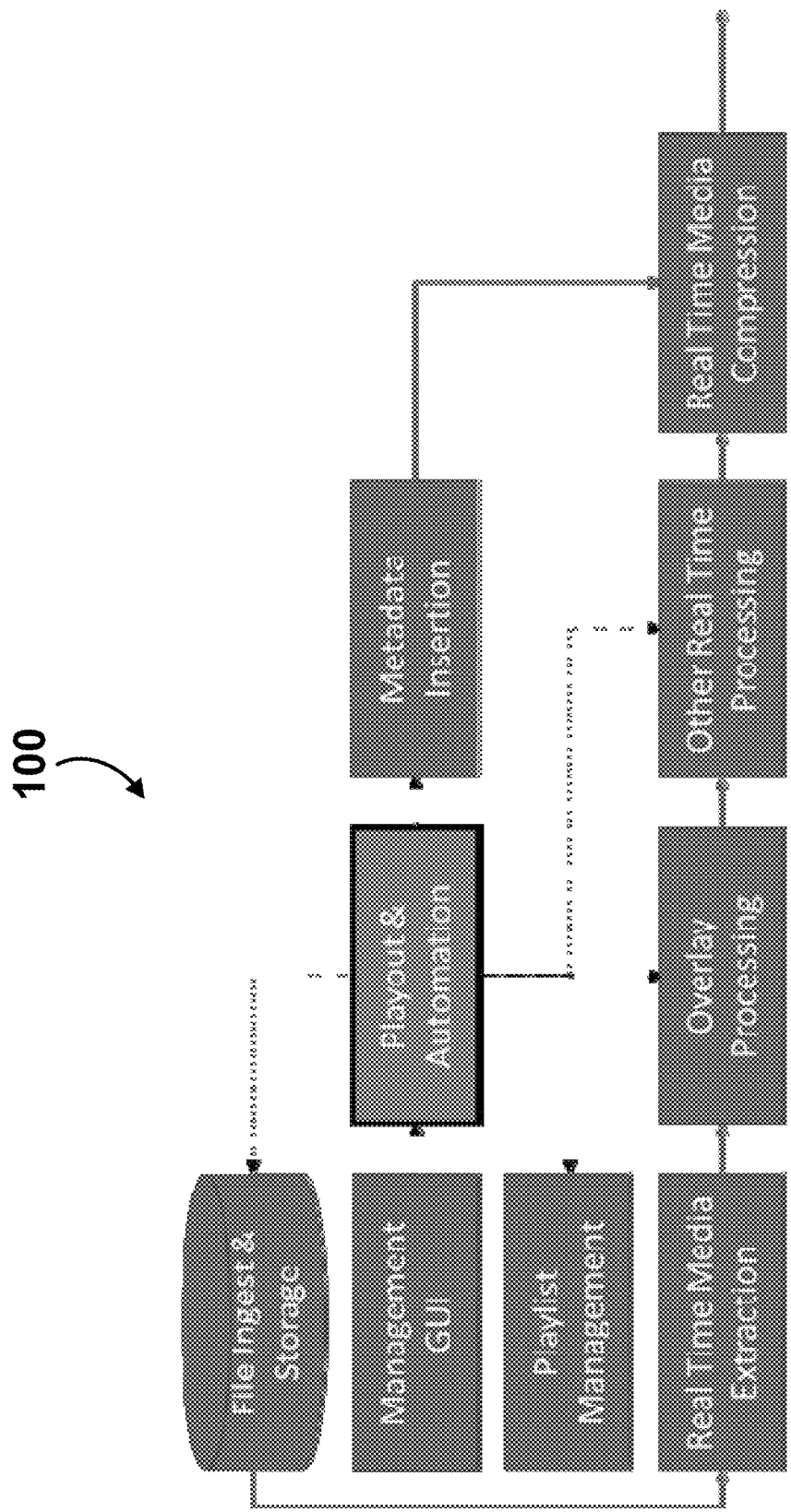
FIG. 1 is block diagram of an example traditional real-time video processing pipeline.

Throughout the following discussion, numerous references may be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The term "connected" or "coupled to" may include both direct coupling (in which two elements that are coupled to each other contact each other) and indirect coupling (in which at least one additional element is located between the two elements).

Throughout the disclosure, the term video may be used to describe moving pictures, associated audio and accompanying metadata. That is, a video may be inclusive of video data, audio data, metadata, and/or any other embedded data.

Video experiences delivered over the air, via satellite and over the cable systems has traditionally been delivered as a continuous stream of content that is encoded, transmitted and decoded with very strict cadence. The cadence of the delivery may be tied to a frame/field rate of the content, and processing of the content at almost every stage of its life needs to be done in real-time or near real-time, that is, in accordance with a specific frame rate. A real-time nature of this operational model and the sequential processing architectures that support it, including the orchestration and control planes, require time-sensitive and mostly dedicated devices.

Mechanisms used to move a frame of video from one processing stage to the next may require the frame to be represented as an uncompressed sample. This means that for cost, storage, or transport efficiencies, a video asset on disk or storage and that has had compression applied therein needs to be unwrapped and decoded from its file container and codec before participating in the real-time delivery ecosystem. The unwrapping and decoding process is computationally intensive and the resulting uncompressed samples may be bandwidth intensive. Similarly, a processing component such as a graphics device needs to receive the high-bandwidth uncompressed samples and render, when appropriate, the necessary text or graphic overlays for each frame before passing the frame (sometimes an augmented frame) to the next device in the processing chain. A production chain may be an example of a processing chain. Because overlays may occur at any time in the stream, the complete video stream is driven through this computationally demanding process, whether or not there are overlays throughout the complete video or not. Eventually the uncompressed and possibly augmented frames may need to be re-compressed or encoded for distribution to client devices, which ingest or receive compressed video streams because distribution mechanisms carry multiple services and there is insufficient bandwidth/economies to distribute video in its uncompressed form. This encoding process must also run in real-time or near real-time while requiring high bandwidth for its input and being very computationally intensive. The encoding and decoding process covers a wide number of codecs, further, the variety of codecs chosen can vary depending on where in the pipeline the process must occur. For instance, a linear stream on input could be uncompressed, compressed using J2K, MPEG2 or many other codec types but they can be high quality solutions. On encoding the target formats could be h.264, h.265, or many others. Similarly the audio may also require handling and could be in a number of different formats (AAC, AC-3, AC-4, AES uncompressed, etc.)

Each time a video is decoded and re-encoded there may be generational loss of quality and intensive processing, which leads to complexity and cost. There may be several generations of decoding, processing and encoding between the source of content and its final consumption by its intended audience, e.g. a mobile device. When video content providers originate a video stream, they tend to use a playout system that manages the above-described real-time processes. The playout system converts playlists, which may be sequences of video content corresponding to different programs, advertisements, and live content, into an output stream, allowing for pre-scheduled and real-time control of stream switching, overlay insertion, and monitoring.

The playout system may also be responsible for inserting metadata into the video stream, where such insertions may also be scheduled in the playlist as secondary events. This metadata can include captioning data or information (such as SCTE-35 cues) specifying the location in the stream of advertisements or program start and end locations. This metadata is an important component of the video distribution ecosystem, but since it is carried in-band in the video stream, accessing it (for example, to substitute national advertisement with local advertisement, or to translate captioning information from one language to another) also requires computationally complex processes.

Embodiments of systems described herein can provide a mechanism for processing one or more video streams (e.g., including inserting metadata, data, overlays, augmentations, and/or manipulating timing, ordering, and/or scheduling, etc.), where the mechanism is less computationally intensive due to fragmentation of the one or more video streams and/or managing video as fragments. For example, a subset of fragments can be selected for particular processing, without processing other fragments in the same way. One example might be the insertion of graphical overlays such as those used to show the score of a game. Another example would be to insert promotional material (often referred to as lower thirds), the content of which would vary by distribution market (Los Angeles would get different content than New York). Another example might be an update of the weather, local to each distribution market. This can reduce computational resources by reducing the amount of data (e.g., number of fragments) that needs to be processed when only a portion of the data need be processed to generate a desired result (e.g., a resultant video stream with overlays in certain portions).

This can allow video content providers to generate one or more output streams, where each output stream can be configured with a particular order, arrangement, and/or scheduling of fragments and/or content, and/or presence/absence of content (e.g., overlays, metadata, captions, augmentation, etc.). The particular configuration(s) can be based on one or more playlists, manifests, network characteristics, request characteristics, and/or sender, receiver, or client characteristics or configurations (including playback configurations).

The number of output streams can come from a playlist, for example, which could have sub-parts noting which regions need separate or unique content. The system can use this data to determine or schedule fragments. Fragments could be marked with geographic data for a particular region. Manifests contain data regarding the video assets. Manifests can be generated by any number of different systems which may dictate changes to the content (fragments) based on numerous conditions such as subscriber, region, bandwidth, and so on. Where a particular target region is bandwidth challenged the manifest may opt to skip certain fragments for the purpose of saving bandwidth. It may opt for more simple graphics overlays which are easier to compress, saving bandwidth. The typical use case is to separate markets by demographic or other data, this separation of markets creates an opportunity to generate different video deliverables which can be fulfilled by manipulating the fragments and providing selective processing of the fragments. An example is weather, where weather forecasts are tied to specific regions and the system can generate and deliver unique fragments in order to fulfill the local weather forecast for multiple regions. A manifest can specify events, scheduling requirements, and/or timing in relation to specific fragments. A manifest can also reference unique fragments to generate a set of fragments. There may be a unique manifest for each destination or region, for example. A unique manifest can indicate or reference of combination of fragments to generate an output video stream. Another unique manifest can indicate or reference another combination of fragments to generate a different output video stream. The resulting output may be a live fragmented-video manifest that is representative of the programmers' intended channel using a combination of file, live and rendered fragments. A manifest is a file full of reference information that tells whatever system is listening where to find the source content, and its timing. It contains no actual content, the content is contained in fragments. A manifest is a list of fragments.

A manifest file contains metadata for a group of accompanying files that are part of a set or unit. A video player can request and assemble video assets for playback using a manifest file. The manifest file provides the locations of video assets (or fragments). The manifest contains information about compression used, subtitles, closed-captions, bitrates, and so on.

FIG. 1 shows an example of a real-time video playout system 100 in block diagrams. Each block represents a logical processing step in the system. As can be seen, there may be a significant amount of processing and management of video content that is produced and streamed in real-time, which may take up a lot of network resources.

There may be a great amount of effort in traditional real-time video processing because network designs, inclusive of computer, may operate as a fixed purpose topology, dedicated to adhering to the strict cadence required by intrinsic video timing. When video was still in analog form, the strict timing was an engineering requirement of the system to ensure that all processing would happen on strict frame boundaries. At present, with current computer environment, the problem can be solved differently, as timing can be handled locally within the devices that require strict manipulation within a video content (i.e. switching from one content stream to another with frame accuracy).

Fragmented video, as used in ABR streaming protocols (such as MPEG DASH or Apple's HLS), breaks video and audio into sequences of short-duration chunks, often referred to as "fragments", that are reconstituted at the client devices (or "client" for short) and played back sequentially. Video fragments may be created at different bitrates and resolutions so that client devices can choose an appropriate fragment based on network bandwidth or other considerations. Typically, a fragment may represent between 2 to 6 seconds of encoded video, though other fragment durations are possible.

For example, a video content or asset may be encoded into multiple streams or profiles of video and/or audio content with varying bitrates. For example, the encoder may output five video streams, each at a bitrate of 0.2, 1, 3, 6, and 8 Mbps, which may correspond respectively to a resolution of 320×180p, 640×360p, 1280×720p, 1280×720p, and 1920× 1280p. The varying bitrates may allow a client device to accommodate different network conditions while streaming the video. Each encoded stream at a fixed bitrate or resolution may be referred to as a single profile. For example, each of the encoded streams may be an MPEG transport stream of a specific bitrate or resolution. Once encoded, each profile may be segmented, by a segmenting process, into multiple, contiguous file segments which are also referred to as fragments. The encoding and segmenting processes may be performed by a server or a different computing device or circuit. Each file segment or fragment may be a multi-second portion of the stream or profile. For example, each file segment or fragment may be a stream of 2 to 10 seconds long. In some embodiments, both video and audio are fragments encoded such that each video profile may contain both video and audio data. In some embodiments, the audio content may be separated from the video content, and encoded to its own audio fragments or profile. In some embodiments, each fragment may be further encapsulated and/or encrypted for secure transmission. Part or all of the fragments may be further stored on a storage device. A manifest file or simply manifest may be configured to keep track of locations of all the fragments.

Clients may download a manifest or a playlist that contains information about the available fragments suitable for download and playback. In on-demand video, manifests typically list all available fragments, while in linear steams, manifests may be updated to inform clients about the most recently available fragments. Fragmented video is used predominantly over IP networks by over-the-top (OTT) providers to deliver file based assets that have been pre-processed and/or compressed and stored for consumption on demand and for live streams that have been preprocessed using traditional real-time systems and then encoded and/or chunked in real time.

Fragmented video can be used for distributing video to client devices, such as tablets, phones, computers, smart TVs, and TV-connected playback devices. Playout system can originate content that is not fragmented, which is then consumed by over-the-air devices (such as televisions), service aggregators (such as MVPDs), or regional broadcasters. The use case for fragmented video and the use case for a playout system may require different technologies and devices (e.g., transcoders and packagers) that convert real-time playout-originated video into fragmented video.

In accordance with an embodiment, a system that utilizes fragmented video in a playout environment is provided. As described herein, the utilization of fragmented video in playout may simplify the processing and assembly of video content and allows for a mixture of real-time and non-real-time processing of video, which may lead to a significant reduction of computational processing requirements.

Embodiments described herein may provide systems, methods and devices for providing playout of fragmented video content. Embodiments described herein may not need modification of existing workflows for origination of video content.

Embodiments described herein may provide hints or guidance data for editorial timing and processing with potential benefits to downstream optimization. The guidance data can come from a manifest file which contains instructions (fragment selection and order) for a particular region.

Embodiments described herein may simplify the processing chain for video delivery which can allow for optimization of the overall processing pipeline. Systems are not instantiated (brought online) unless and only when they are required. Typical systems might have one playout server per output deliverable (e.g. for 10 regions you have 10 playout systems). In a fragmented system you may have 1 playout system and 5 systems that are being used just for fragment processing. This can optimize use of resources.

Embodiments described herein may reduce generational loss. Less of the video need be processed (since only certain fragments can be selected for processing) and less processing translates to less loss of information. In essence every time you can avoid touching the video, you preserve more quality Embodiments described herein may enable flexible computing models for the processing or augmentation of video. The system only needs to process unique fragments and when the fragments are the same, no processing is necessary. The association of processing load to output requirements as dictated by the manifest allows for a more dynamic relationship between compute resources and output requirements. Example; for 16 hours a day all regions receive the same content (e.g. when viewership is low) and for 8 hours of high viewership the system can bring on more resources to deal with the fragment processing.

Embodiments described herein may reduce or eliminate the need for IP networks to behave as signal switched video paths. Traditional video streams can require linear delivery of each sample of video, in a specific order, at an exact cadence. Any disruption to bandwidth, order, or cadence will cause disruptions in the video. Fragments can be buffered, pulled more quickly than real-time, and can be cached in the network. Each fragment is a separately managed unit of video and/or audio. This enables fragments to be processed using different processing techniques.

Embodiments described herein may leverage existing fragmented video capabilities. Embodiments described herein may reduce infrastructure requirements given the compute optimization leveraged. Embodiments described herein may reduce or eliminate real time constrains of video origination. Embodiments described herein may scale quickly and easily. Embodiments described herein may align with modern cloud and datacenter architecture. Embodiments described herein can be deployed on computer platforms. Embodiments described herein may provide improved inclusion of video metadata. Embodiments described herein may allow playout of video in fragmented format, which may be more resilient to errors and suitable for more cost-effective emission of video In some embodiments, a system for providing fragmented video for playout of fragmented video content may include utilizing a Manifest Processing Engine (MPE) as part of the playout system. The engine may direct the playout system to combine video fragments from live and file based manifests. The manifests can be the same and only the source of the fragments can be different. A file based fragment could come from a library of previously processed and fragmented content. A live fragment could come from a live event. The manifests can be driven by program scheduling requirements. The notion of a program schedule is not limited to manifests but manifests are an example mechanism to separate linear and monolithic scheduled lists into network delivered and wholly contained parts. The playout system may receive video fragments, and output a video stream based on the manifests. In some cases, the manifest, as unique representation of playout/program schedules, may contain some or all of the program scheduling requirements.

In some embodiments, the MPE may generate a master manifest, as further described below.

Real-time processing of video in playout may be shifted to a system that can process video in real-time, when needed, and ahead-of-time, when possible. This may allow the computationally intensive processing to be done in advance when input streams and timing data allows. It also significantly reduces the real-time computational resources required by traditional playout systems. When real-time processing is required, for example for addition of emergency alert text overlays that cannot be scheduled in advance, the system may process only the video fragments that require the overlay, not the complete video, further reducing computational load. Data regarding which video fragments to select to add the overlay can be included in the manifest or data could come from an external system making real-time decisions, for example.

Figure 2:
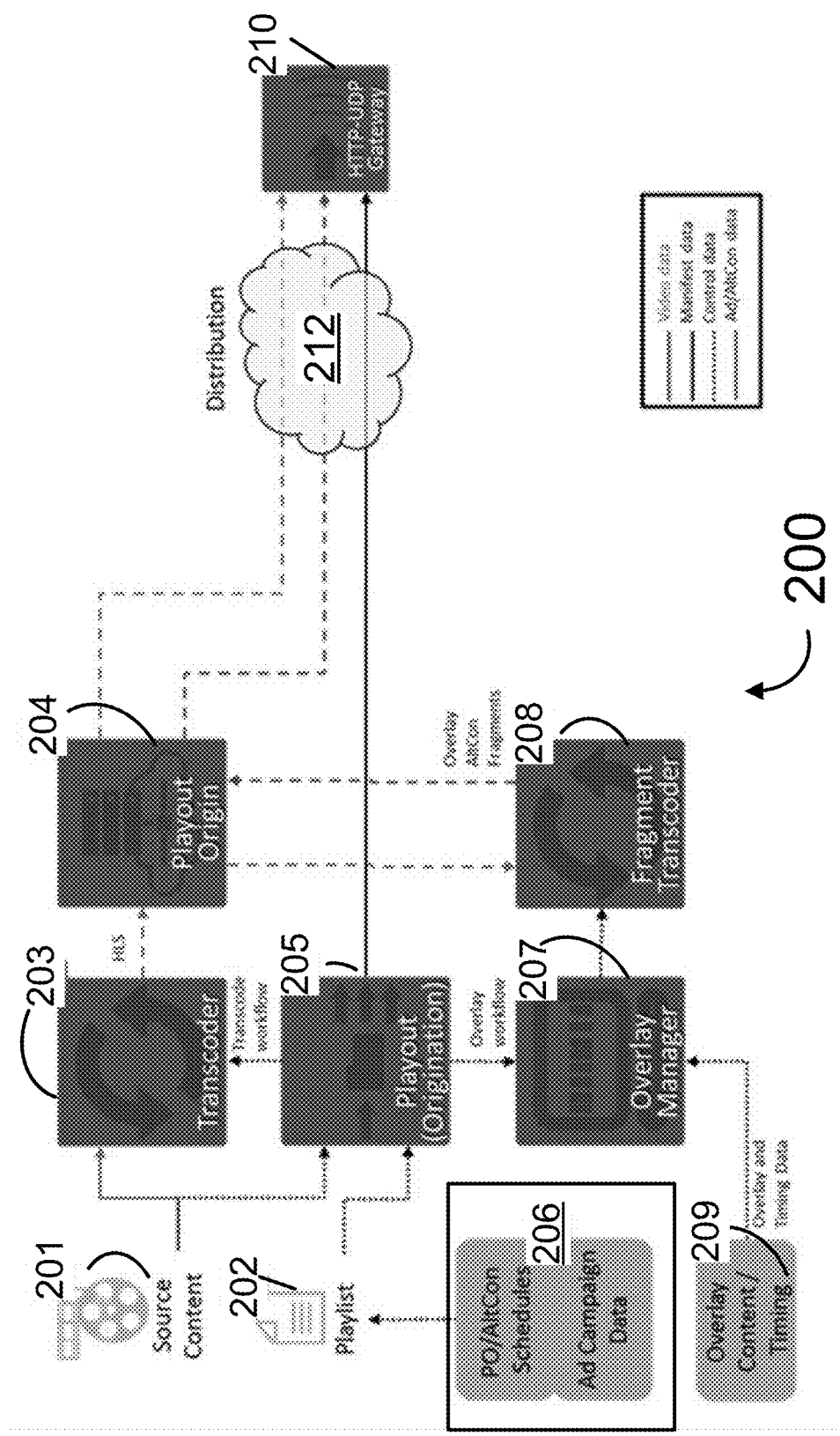
FIG. 2 is a block diagram of an example workflow for playout of fragmented video content in accordance with one embodiment.

Referring now to FIG. 2, which demonstrates a block diagram of an example system 200 for playout of fragmented video content in accordance with an embodiment. As shown, system 200 may include a source content 201, a playlist 202, a transcoder 203, a playout origin store 204, a playout origination unit 205, an Advertisement and Alternate Content (AltCon) service 206, an overlay manager 207, a fragment transcoder 208, an overlay content and timing service 209, a network 212 and a HTTP-to-UDP gateway 210. Each component is further described below.

In one embodiment, source content 201 may be delivered to a playout system 200 in multiple source formats (e.g., mezzanine). In some embodiments, content can be provided as file based video sources, live video sources, or any mix of live or file based sources. Content can be delivered by reference either through a dependent proxy file, or through description in a playlist or manifest. Data in a playlist/manifest can point the system to a location on a server where the content can be retrieved. Content can be delivered by any number of protocols such as ftp, http, or other protocol in a timing manner where the result can be indistinguishable from live content. Content can be delivered by any number of protocols such as ftp, http, or other protocols in a manner that emulates a file delivery. Content can be provided as encrypted or unencrypted.

In one embodiment, a playlist 202 may be used to define video programs that play out in sequence to create a linear video stream output. The playlist 202 may contain events for insertion of alternative content, overlays, metadata, audio, ancillary data, events, and other video processing required to create the complete output video stream. Playlists can directly reference source content, for example.

In an embodiment, transcoder 203 may be an offline video transcoder or an on-line live transcoder. The transcoders may be used to convert source content 201 into a format suitable for fragmented video delivery. The transcoder 203 may be managed by the playout origination unit 205 and in the case of the offline transcoder can be applied to the source content 201 well in advance of the video content playout time.

When the rendering of new fragments is required to represent graphical overlays, compositions and other augmentations, transcoder 203 can receive or generate a new manifest for rendering one or more new fragments in time for delivery. The resulting output may be a live fragmented-video manifest that is representative of the programmers' intended channel using a combination of file, live and rendered fragments. Manifests can establish the reference to the source media fragments and the order (e.g. sequence) to play them back with. The reference can be location data that indicates a storage location of a fragment, for example. The order of the frames can be indicated in timing data stored in the manifest. The system 100 can leverage the manifest (e.g. location and timing data) to reference content and generate the video stream. When a transcoder 203 creates new fragmented content, it updates the manifest to point to or reference the newly created content. The transcoder 203 can update the timing data and location data in the manifest to indicate new fragments (e.g. processed fragments).

Playout origin store 204 may be a storage and video service device that is configured to store the transcoder output for later delivery. It may utilize HTTP or other protocols to serve video fragments to downstream devices.

Playout origination unit 205 may be configured to manage one or more processes in the delivery chain. It may be configured to manage pre-processing of video, as well as real-time processing. One function of playout origination unit 205 may be to create fragmented-video manifests that reflect the ingest playlist for transcoder 203 in order to create a stream suitable for origination. As shown, transcoder 203 receives source content. The manifests controls what fragments the transcoder 203 should process. The transcoder processes the source content (e.g. fragments of the source content) and updates the manifest to reflect the newly created content). The playlist or manifest dictates the final order of content. The manifest can include the playlist in some embodiments. The manifests which are sent to the transcoder 203 tell the transcoder 203 what to do to the select subsets (e.g. fragments) of the source media for processing. Note that the playout 204, 205 server(s) can send manifests (and fragments) directly to the gateway 210 and the transcoder 203 might only provide the content (fragments and updated manifests) required. The playout origination unit 205 can then provide these manifests to transcoder 203, which uses them as instructions for how to manipulate the fragments/insert overlays/etc. In some embodiments, playout origination unit 205 may generate transcoder workflow for transcoder 203 and/or overlay workflow for overlay manager 207.

Advertisement and Alternate Content (AltCon) information 206 may be retrieved from a database. The information 206 may be utilized to create playlists ingested by the playout origination unit 205, when required. These allow dynamic creation of streams with alternate content that is targeted to a subset of distribution, as well as signaling the insertion of metadata (such as the location of program and advertisement boundaries) into the playout stream. In some embodiment, AltCon information 206 may be stored in a database. In some embodiments, AltCon information 206 may be dynamically provided by a server.

Overlay manager 207 may be configured to manage pre-processing and real-time insertion of video fragments that require graphic or text overlays, when required. Overlay manager 207 may control a fragment transcoder 208 that is used to transcode fragments requiring overlays, by supplying it with the overlay data and only the appropriate fragments requiring processing. The playout origination unit 205 receives the playlist and uses the data of the playlist to generate a manifest for playout of the source content. The overlay manager 207 can use the manifest received from playout origination unit 205 to select the appropriate fragments for processing or decide what overlay data to use and where to insert it in relation to different fragments. This can fulfill the unique requirements found in the playlist. The playlist has the reference for where to get existing overlay data but it may also reference an external document that describes how to create this overlay data on the fly. In any case, the newly created manifests pass along a reference to where to find the data (e.g. processed fragments, overlays), in this example, fragment transcoder 208. The overlay manager 207 gets a manifest which points back to the source material and overlay data. The transcoder 203 renders from source content and the fragment transcoder 208 renders from fragments. The two components (203, 208) can be managed differently. For example, fragment transcoder 208 might only be needed at certain times (e.g. when fragments are rendered) and the number of units required (Scale) is dynamic, based on the number of outputs that have to be created. The transcoder 203 is more related to the original channel and is likely running 1:1 with that original channel. The transcoders 203, 208 process the source content and fragments to manipulate video, audio, text, and instructions into the overlay or replacement data. The manifests tell the fragment encoder 208 what to generate.

Fragment transcoder 208 may be configured to add overlay data to video fragments, when required. In some embodiments, transcoder 203 can manage the pre-processing of overlays. For example, in the weather example provide above, 80% of the graphic (the company logo, background, and color scheme) is identical, and only the actual local weather temperate changes. The transcoder 203 can also add overlay data to video fragments like fragment transcoder 208 does. Fragment transcoder 208 may be configured only for just-in-time processing of fragments. This can involve creating unique content as described above for real-time insertion. In some embodiments, fragment transcoder 208 and transcoder 203 may be implemented as the same functional component. In other embodiments, they may be implemented as separate components.

Overlay data and timing 209 may be supplied to overlay manager 207 for management of overlay insertion. Timing in this sense is relative to the intended delivery or playback cadence. There is no requirement for real-time or isochronous timing within the system. Manifests carry timing as part of the standard, for example.

HTTP-to-UDP gateway 210 may be configured either at the playout center or at a remote location to ingest the manifests generated by the system 200, and output traditional, contiguous streams (such as MPEG-2 Transport Streams) for use with existing equipment that uses this format. The use of this component allows the system to be used in existing environments without requiring any modification to components that are downstream of the playout system 200.

The playout system 200 is configured to provide playout of fragmented video content for video origination. The playout system 200 receives a playlist 202 and source content 201. The playlist 202 indicates a playout sequence and one or more program scheduling requirements. The source content 201 can be provided as file based video sources, live video sources, or any mix of live or file based sources. The source content 201 can be delivered by reference either through a dependent proxy file, or through description in a playlist or manifest. The playlist 202 is used to define video programs that play out in sequence to create a linear video stream output. The playlist 202 contains events for insertion of alternative content, overlays, metadata, audio, ancillary data, events, and other video processing required to create the complete output stream. These are examples of program scheduling requirements. In some embodiments, the source content 201 is a combination of live, file and augmented sources.

The playout system 200 uses transcoder 203 to convert source content 201 into video fragments. Each fragment is a separately managed unit of content that can be processed and manipulated independent of other fragments. The transcoder 203 and the fragment transcoder 208 process the video fragments based on the playlist to generate processed video fragments. The playout 205 generates a fragmented-video manifest based on the processed video fragments. The fragmented-video manifest contains timing data and location data for the processed video fragments. The location data can indicate a storage location of the processed video fragments. The timing data can indicate a sequence of the processed video fragments for generating the output data stream. In some embodiments, the video fragments can be a combination of file based video fragments, live video fragments, and rendered video fragments. In some embodiments, the video fragments are a combination of variable and consistent length fragments.

The transcoder 203 is managed by the playout (origination) 205 and, in the case of an offline device, can be applied to the source content 201 well in advance of the playout time. An optimization process can ensures that source content 201 that is utilized in multiple output streams need only be processed once to generate the desired fragment as per the requirements. The transcoder 203 and the fragment transcoder 208 may also be used to insert text and graphic overlays into the video stream, using content and timing data. The transcoder 203 and the fragment transcoder 208 may also insert metadata into the video stream, such as captioning or other program data. Any manipulation of timing such as the synchronization of closed captioning to video content or the expansion of content length can also be handled by the transcoder 203 and the fragment transcoder 208. The fragment transcoder 208 can be used to add overlay data to video fragments, when required. In some embodiments, the transcoder 203 can manage the pre-processing of overlays and the fragment transcoder 208 can be used for just-in-time processing of fragments for real-time insertion.

The system 200 can output the fragmented-video manifest (e.g. at gateway 210) for generation of the video stream using the processed video fragments. The playout origin 204 can store the processed video fragments (transcoder output) at a data store, for example, for later delivery and to serve video fragments to downstream devices.

The system 200 can manage the other processes in the delivery chain. It is used to manage pre-processing of video, as well as real-time processing. The system 200 can create fragmented-video manifests that reflect the ingest playlist in order to create a stream suitable for origination.

In some embodiments, the system 200 can process another set of video fragments and generate another fragmented-video manifest. The new set of video fragments can be used to output another different video stream. The fragments of the same source content 201 can be processed in different ways to generate different output video streams. Different manifests can be generated for use in the generation of the different output video streams. This enables an efficient use of resources as only individual fragments may be processed and combined to generate the new output (instead of entire set of source content, for example).

In some embodiments, the system 200 can process a first set of video fragments using a first processing technique and a second set of video fragments using a second processing technique. The system 200 can generate different output data streams using the same source content 201 by processing fragments of the source content 201 in different ways. Processing fragments using different processing techniques generates different (new) fragments that can be integrated to generate different video output streams. This enables an efficient use of resources as only individual fragments may be processed in different ways (instead of entire set of source content, for example) to generate the new output.

In some embodiments, the overlay manager 207 is configured to process the video fragments by adding overlays to the video fragments. Overlay data and timing 209 is supplied to the overlay manager 207 for management of overlay insertion. Timing in this sense is relative to the intended delivery or playback cadence. There is no requirement for real-time or isochronous timing within the system 200, for example.

In some embodiments, the system 200 is configured to generate the video stream using the fragmented-video manifest. In some embodiments, the timing data of the fragmented-video manifest provides a timing reference for the plurality of video fragments. The system 200 can use the manifest to assemble fragments to generate the output data stream. The timing reference indicates a temporal boundary of processing for the video fragment. In some embodiments, the system 200 is configured to identify the video fragments for processing based on program scheduling requirements.

In some embodiments, the system 200 (or components thereof) is configured to store the processed video fragments and the fragmented-video manifest.

In some embodiments, the system 200 is connected to a delivery or distribution 212 system configured to respond to requests for the source content using the fragmented-video manifest to request the processed video fragments.

In some embodiments, the system 200 is configured to process a video fragment by extending, truncating or synthesizing content to align the content with an event.

In some embodiments, the system 200 is connected to an optimization engine that can manipulate the fragmented-video manifest to control resource utilization.

Figure 3:
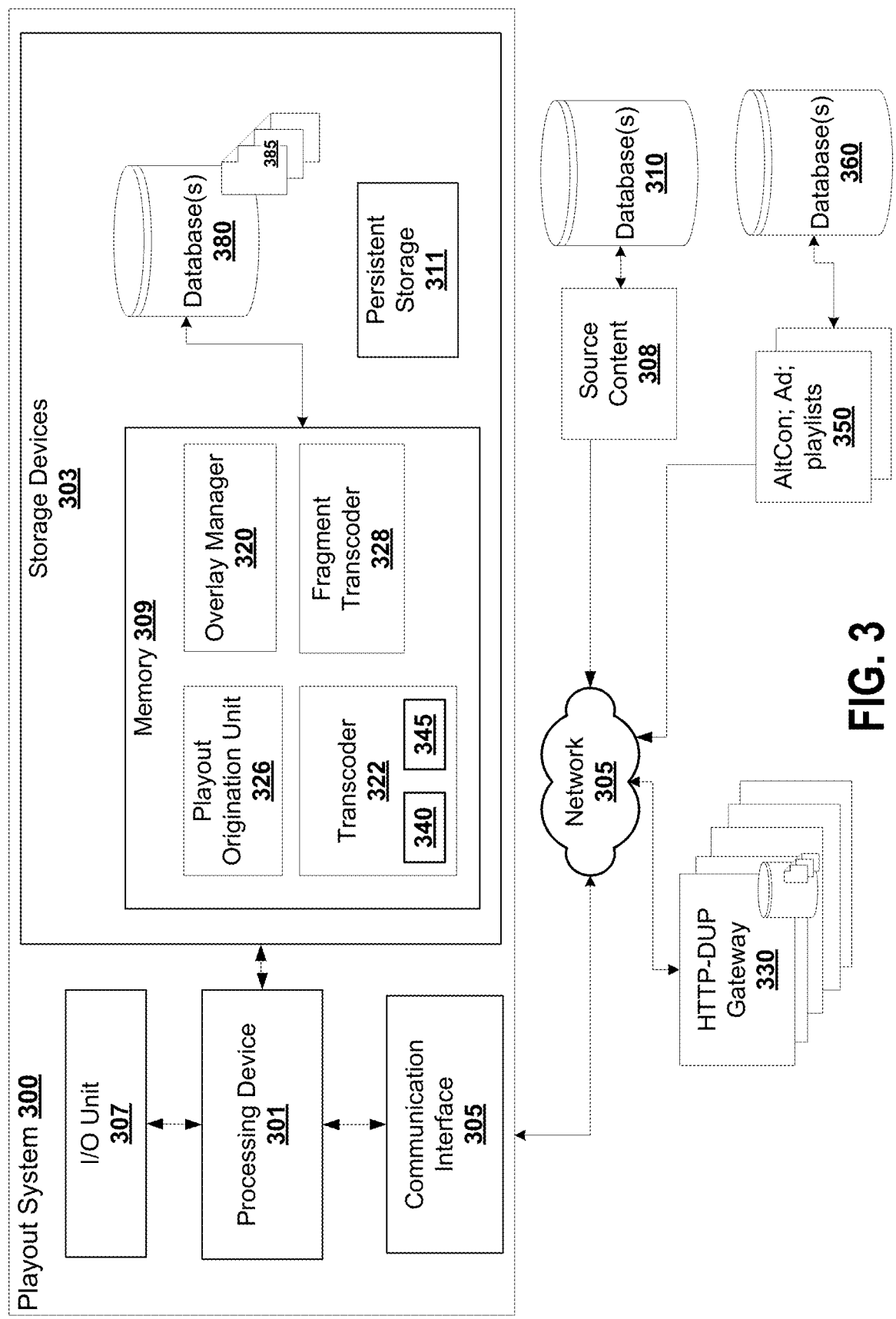
FIG. 3 is schematic diagram of a video playout system in accordance with some embodiments.

Referring now to FIG. 3, which shows an example schematic diagram of a playout system 300 for fragmented video content. System 300 may be configured to: receive source content 308 from databases 310 and Advertisement and Alternate Content (AltCon) information 350 from databases 360; process and playout fragmented video content for origination based on the AltCon information 350; and transmit the video content over network 305, to HTTP-DUP Gateway 330. Playlists may also be obtained from database 360 along with AltCon information 350 in order to process source content 308. Some of the components of FIG. 3 correspond to components of FIG. 2.

Each I/O unit 307 enables the system 300 to interconnect with one or more input devices, such as a keyboard, mouse, camera, touch screen and a microphone, or with one or more output devices such as a display screen and a speaker.

A processing device 301 can execute instructions in memory 309 to configure playout origination unit 326, overlay manager 320, transcoder 322 and optional fragment transcoder 328. A processing device 301 can be, for example, any type of general-purpose microprocessor or microcontroller, a digital signal processing (DSP) processor, an integrated circuit, a field programmable gate array (FPGA), a reconfigurable processor, or any combination thereof.

Each communication interface 305 enables the system 300 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

The storage 311 may be configured to store information associated with the video processing units. Storage 310, 360, 380 and/or persistent storage 311 may be provided using various types of storage technologies, such as solid state drives, hard disk drives, flash memory, and may be stored in various formats, such as relational databases, non-relational databases, flat files, spreadsheets, extended markup files, etc.

Database 380 may be configured to store playlists and manifests 385.

When the rendering of new fragments is required to represent graphical overlays, compositions and other augmentations, a Manifest Orchestration Engine (MOE) 340 may orchestrate and/or execute a Manifest Processing Engine (MPE) 345 to generate a new manifest 385 for rendering one or more new fragments in time for delivery. A manifest can be an XML file which can contain arbitrary references or instructions. The manifest can contain certain tags that are acted on by the downstream engine or components of system 100. The manifest provides coded directions (e.g. timing data) for how fragments (e.g., some containing overlay data) should be ordered and scheduled e.g. so that during playback, the video is shown having the appropriate overlays. Every time a component of system 100 manipulates the content or changes the timing of the content, the component updates the manifest. This means that manifests can change almost constantly. The resulting output may be a live fragmented-video manifest 385 that is representative of the programmers' intended channel using a combination of file, live and rendered fragments. In some embodiment, MOE 340 and MPE 345 may be part of transcoder 322 or fragment transcoder 328. The functions of transcoder 322 and fragment transcoder 328 differ by position in the network and the scale at which they run). They can handle the same input and output data. The fragment transcoder 328 is a child of, and dependent on, the upstream components. In some embodiments, the MOE 340 is configured to generate a new manifest representative of a program channel.

In some embodiment, the MOE 340 or MPE 345 performs the function of playout of fragmented video content, without the need for a traditional playout server, since program schedules and requirements are fulfilled by the MOE 340 or MPE 345 at the edge. From the perspective of an end user (e.g. consumer), it is as if they were watching the video content from a playout server.

An optimization process within the MOE 340 may ensure that source content 308 utilized in multiple output streams need only be processed once. The transcoder 322 may also be used to insert text and graphic overlays into the video stream, when their content and timing is known in advance. Lastly, the transcoder 322 may also insert metadata into the video stream, such as captioning or other program data. Any manipulation of timing such as the synchronization of closed captioning to video content or the expansion of content length may also be handled within the transcoder service. These features (inserting text and graphic overlays, inserting metadata, manipulating timing or synchronization) can be accomplished using information contained in manifests.

A MPE 345 or MOE 340 may generate unique manifests for each required playout stream. In an aspect, utilization of fragmented timing as provided by a master manifest may allow an operator or automated solutions to use the fragmented timing as hints for event decisions which may lead to downstream optimizations. The insertion of ads for instant could be a hint, for example. The notion of a hint is that it is somewhat arbitrary, it is up to the downstream systems to take advantage of the hint or not. Optimizations are typically based on scale (how many fragmented transcoders do you need to run to fulfill the number of output streams).

MOE 340 may retrieve manifests 385 from databases 380, and send a signal to transcoder 322 to process video content (e.g. source content 308). The transcoder 322 may be configured to: receive one or more signals from MOE 340 for processing a video content 308; receive one or more video fragments of the video content; and process the one or more video fragments based on information representing one or more timing references from a manifest 385. Overlays manager 320 may insert one or more overlays into the one or more video fragments based on the one or more timing references in manifest 385.

MOS 340 may also determine, based on business rules or other program scheduling requirements, that a new manifest is needed. MOE 340 may send a request to MPE 345 to generate a new manifest 385 based on the business rules or other program scheduling requirements. The manifest 385 may be stored in database 380.

In some embodiments, the manifest-drive processing requirements may include a timing reference indicating a temporal boundary of processing for the video fragment.

In some embodiments, playout system 200, 300 may be implemented alongside a fragmented video content production system (not shown) to provide a fully optimized solution but they do not necessarily rely on each other. Source content 201, 308 may be fed into the production system, which produces a first set of one or more manifests and a first set of one or more video streams or video fragments, which are then transmitted to the playout system 200, 300. The playout system 200, 300 then may be configured to ingest the first set of video streams, based on the first set of manifests, to produce a second set of manifests and a second set of video streams or fragments, which may be then sent to a delivery system. The second set of video streams or fragments may be based in part on requirements or business rules from AltCon server 206. This creates a corresponding number of manifests without necessarily creating more video for the same number of video segments, in other words, with a large enough pool of video segments the overall system may be configured to generate M(n) number of fragment manifests and therefore unique streams. An example advantage is that a large number of manifests can be generated for the same original video stream such that many different types of output video streams can later be generated based on the particular manifests used. The output video streams differ in having different types of overlays/metadata/inserted data or fragments with different scheduling/timing/cadence.

In some embodiments, the playout system 200, 300 may simply take the first set of manifests and first set of video streams and pass them onto the delivery system. For example, where all variants of TV broadcasters (e.g., ABC/NBC/CBC/BBC) are sending the same video to all affiliates, the manifests and video streams would be the same for each of their child subsidiaries.

In some embodiments, there is provided a playout system for playout content for video origination using a fragmented format.

In some embodiments, a system described herein may be implemented at one of the following network locations: on the network side of the distribution plant; in the client or receiver; and in a combination of network and client.

In some embodiments, a fragmented manifest playout engine (e.g., Manifest Processing Engine or Manifest Orchestration Engine) may be implemented to emit live manifests based on a schedule of events using file based fragments. The notion of file and live refer to the availability (timing) of the source. In other words file based fragments can be consumed by any transcoder at many times faster than real-time. A live fragment can be consumed (processed) in real-time (as new fragments will not be available). As another example, manifests based on a schedule of events can use live based fragments. As a further example, manifests based on a schedule of events can use augmented fragments or fragments that have been processed to add overlays/augmentations/meta data. As another example, manifests based on a schedule of events can use interleaved live, file and augments fragments. The manifest provides this context.

In some embodiments, systems and methods disclosed herein may include a delivery system which responds to requests for content by way of consuming a manifest and requesting the associated content from the playout origination unit.

In some embodiments, systems and methods disclosed herein may include a rules engine or an overlay manager that identifies fragments requiring augmentation based on the requirements of scheduled events. Data indicating the fragments requiring augmentation can be stored in manifests.

In some embodiments, systems and methods disclosed herein may include an orchestrator or manager that prioritizes and controls the generation and/or rendering of augmented fragments.

In some embodiments, systems and methods disclosed herein may include a normalization engine that aligns events to fragment time and fragmented video. The engine may be configured to optimize schedules, bandwidth, and compute utilization by aligning events and or content to fragment time. The engine may also be configured to align events to fragment time by extending or truncating content, and/or by synthesizing content to fill in gaps in time. The manifest has a requirement for content to align to a strict timing. The overlay could be shorter than the dictated timeslot, the normalization engine can fill in the remaining portion of the timeslot with black, or extend the last frame of the overlay. These are examples.

In some embodiments, systems and methods disclosed herein may include timing metadata in a playout manifest, allowing downstream components, such as an HTTP-to-UDP gateway or other systems, to prepare the fragmented video stream for traditional streaming, display, or other processing at specified times. This allows the playout fragmented stream to be emitted slightly ahead of time while still allowing reconstruction of the stream with programs that align to specific times.

In some embodiments, systems and methods disclosed herein may include a de-duplication algorithm that identifies and consolidates duplicate or redundant augmentations within one or more channels. Where the content is identical the de-duplication engine can manipulate the manifests to share a single reference to one source of content.

In some embodiments, systems and methods disclosed herein may include a content generation engine that produces augmented fragments as early as possible including up to the time of delivery.

In some embodiments, systems and methods disclosed herein may be configured to provide interoperability with programming, planning and scheduling systems.

In some embodiments, systems and methods disclosed herein may be configured to align with television origination operational practices.

In some embodiments, systems and methods disclosed herein may be configured to operate on one or more of: consistent length fragments; variable length fragments; and combination of consistent and variable length fragments. The manifests know the 'lengths' of video segments, and if there is a problem (segment longer than available content) the transcoder has to make up the difference referencing some set of external business rules or settings.

In some embodiments, systems and methods disclosed herein may be configured to provide manifest augmentation capability that provides for insertion of arbitrary data into the master manifest. For example, the systems and method may be configured to encode and decode specific data in the manifest and translate it into specific instructions which may be used for downstream triggering of events. For another example, the systems and method may be configured to provide data extraction from source fragments or manifests to make execution decisions such as trigger events.

In some embodiments, systems and methods disclosed herein may be configured to switch between live, file and augmented sources.

In some embodiments, systems and methods disclosed herein may provide a software-only implementation that runs on a computer device. Optional acceleration hardware may be implemented if appropriate.

In some embodiments, systems and methods disclosed herein may generate digitally signed delivery certificates, thereby providing the ability to countersign a delivery certificate with an auditable log of delivered content.

In some embodiments, systems and methods disclosed herein may generate authenticated audit logs which may show the difference between intended delivery and actual delivery of content.

In some embodiments, systems and methods disclosed herein may provide user control interface allowing manual input or manipulation of instructions that may configure or otherwise result in the manifest output.

In some embodiments, systems and methods disclosed herein may provide encryption techniques to protect content or requisite decryption to enable manipulation of content.

In some embodiments, systems and methods disclosed herein may leverage encoding slices to reduce the computational effort and generational loss in fragment augmentation.

In some embodiments, systems and methods disclosed herein may include an optimization engine which manipulates the manifest to optimized delivery of content. The optimization engine may be configured to perform one or more of the following actions: add, subtract, or augment the manifest to control network utilization; add, subtract, or augment the manifest to control CPU utilization on a device; and ability to add, subtract, or augment the manifest to control the insertion of content from alternative systems.

Referring now to FIG. 4, which shows an example of a video content playlist 400 in accordance with an embodiment. In some instances, a playlist can be the same as a manifest that has instructions for manipulating the timing and identity of video fragments in a video stream. The manifest may contain machine code to instruct production and distribution devices, for example. In some embodiments, the playlist 400 may include one or more content streams, such as for example national content 403, region 1 content 405a, region 2 content 405b, and so on (405c, 405d). Each content stream 403, 405 may include one or more of video fragments 401a . . . 401f. Some streams (e.g. regions 1 to 4 405a, 405b, 405c) may have unique fragments (e.g. "regional fragment"), while others (e.g. region 5, 405d) show only national content. The unique fragments may be generated by processing fragments of the source content using different processing techniques. For example, a unique fragment may be generated using an overlay unique to a region. The system 200 can generate a unique manifest for different sets of fragments. The system 200 can generate a unique manifest for each region, for example. By generating a unique manifest for each region, a number of combinations of national and unique fragments is possible. Manifests can be generated at all stages. The reason to have a manifest instead of a playlist is that playlists are for operators, manifests are for computers, providing them with instructions for where to find content, what its timing is, and what should be done with the content. Accordingly, playlist 400 can be viewed as a visual example of contents of a manifest code.

In some embodiments, manifests may be generated as many as required to service as many outputs as necessary. In some cases, millions of manifests may be generated during one second.

For example, a unique manifest may be generated for each destination, e.g. each of television service, channel, and mobile device. The system 200 may take in requests from each destination and generate a unique manifest correspondingly, based on different rules, for example.

Figure 5:
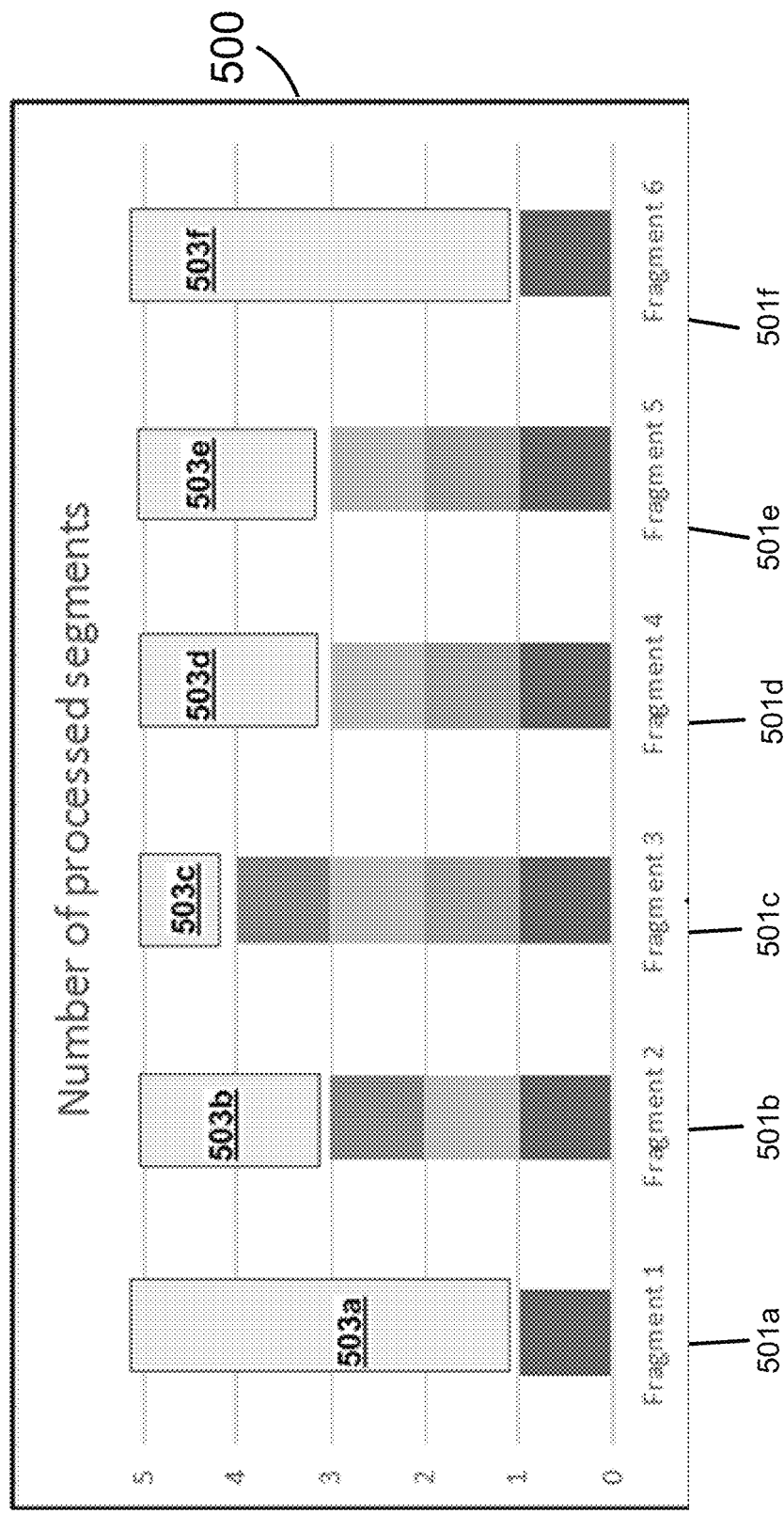
FIG. 5 shows an example computational load for processing different regions.

Referring now to FIG. 5, which shows an example computational load for processing the five regions 501a . . . 501f in FIG. 4. In this example, the space above each bar 501a . . . 501f corresponds to a computational saving 503a . . . 503f provided by system 200. The system only has to process the video fragment that needs to be manipulated instead of the entire video (and can know which fragment to select for processing based on a manifest that identifies where/when events need to be inserted.

Present disclosure provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

As can be understood, the examples described above and illustrated are intended to be exemplary only.

What is claimed is:

1. A computer-processor-implemented playout system for providing playout of fragmented video content for video origination, the system including:

a non-transitory data store; and a processor configured to:

receive a playlist and source content, the playlist indicating a playout sequence and one or more program scheduling requirements;

originate augmented content for at least one viewer based on metadata associated with at least one of the playlist or the source content;

convert, via a transcoder, the source content into a plurality of video fragments, each fragment being a separately managed unit of content;

process, via the transcoder, one or more of the plurality of video fragments based on the playlist to generate processed video fragments for the at least one viewer, at least one of the plurality of the processed video fragments comprising the augmented content, respective metadata for each processed video fragment indicating at least one viewer associated with that respective processed video fragment;

generate a fragmented-video manifest based on the processed video fragments for the at least one viewer, the fragmented-video manifest containing metadata associated with the at least one viewer, timing data and location data for the processed video fragments to generate a video stream suitable for origination, the metadata associated with the at least one viewer indicating the at least one viewer, the location data indicating a storage location of the processed video fragments, the timing data indicating a sequence of the processed video fragments;

store the fragmented-video manifest and the processed video fragments in the non-transitory data store; and output the fragmented-video manifest for origination of the video stream for the at least one viewer using the processed video fragments associated via metadata with the at least one viewer.

2. The computer-processor-implemented playout system of claim 1, wherein the processor is configured to process another set of one or more of the plurality of video fragments, generate another fragmented-video manifest, and output the other set of video fragments being different than the processed video fragments for use if generating another video stream.

3. The computer-processor-implemented playout system of claim 1, wherein the processor is configured to process a first set of video fragments using a first processing technique and a second set of video fragments using a second processing technique.

4. The computer-processor-implemented playout system of claim 1, wherein the processor is configured to process the one or more of the plurality of video fragments by adding overlays to the video fragments.

5. The computer-processor-implemented playout system of claim 1, wherein the timing data of the fragmented-video manifest provides a timing reference for the plurality of video fragments, wherein the timing reference indicates a temporal boundary of processing for at least one of the plurality of video fragments.

6. The computer-processor-implemented playout system of claim 1, wherein the processor is configured to generate the video stream using the fragmented-video manifest.

7. The computer-processor-implemented playout system of claim 1, wherein the system includes a Manifest Processing Engine configured to generate the fragmented-video manifest by generating the timing data and location data corresponding to the processed video fragments.

8. The computer-processor-implemented playout system of claim 1, wherein the plurality of video fragments comprises one or more of a file based video fragment, a live video fragment, and a rendered video fragment.

9. The computer-processor-implemented playout system of claim 1 connected to a delivery system configured to respond to requests for the source content using the fragmented-video manifest to request the processed video fragments.

10. The computer-processor-implemented playout system of claim 1, wherein the processor is configured to identify the one or more of the plurality of video fragments for processing based on the one or more program scheduling requirements.

11. The computer-processor-implemented playout system of claim 1, wherein the processor is configured to process a video fragment by extending, truncating or synthesizing content to align the content with an event.

12. The computer-processor-implemented playout system of claim 1, wherein the video fragments are a combination of variable and consistent length fragments.

13. The computer-processor-implemented playout system of claim 1, wherein the source content is a combination of live, file and augmented sources.

14. The computer-processor-implemented playout system of claim 1 connected to an optimization engine that can manipulate the fragmented-video manifest to control resource utilization.

15. The computer-processor-implemented playout system of claim 1, wherein the augmented content is generated at least one of:
before receipt of the playlist and the source content;
during receipt of the playlist and the source content; or
after receipt of the playlist and the source content.

16. The computer-processor-implemented playout system of claim 1, wherein the transcoder processes video fragments temporally based on the program schedule requirements.

17. A device comprising:
a processor; and
a memory storing instructions which when executed by the processor configure the processor to:
receive source content of one or more video files;
determine one or more program scheduling requirements based on a playlist;
originate augmented content for at least one viewer based on metadata associated with at least one of the playlist or the source content;
convert the source content into a plurality of video fragments;
generate new video fragments based on the one or more program scheduling requirements for the at least one viewer, at least one of the plurality of the new video fragments comprising the augmented content, respective metadata for each new video fragment indicating at least one viewer associated with that respective new video fragment;
transmit metadata for the new video fragments to a playout device to update a manifest for the at least one viewer to reference the new video fragments, the metadata indicating the at least one viewer; and
output or store the new video fragments.

18. The device of claim 17, wherein the program scheduling requirements comprise one or more of: a graphical overlay, a composition, and a text augmentation.

19. The device of claim 17, comprising a Manifest Orchestration Engine configured to generate a new manifest representative of a program channel.

20. The device of claim 17, wherein the processor is configured to generate another set of new video fragments based on another set of program scheduling requirements, transmit new metadata for the other set of new video fragments to generate another manifest for generating a new video stream with the other set of new video fragments being different than a video stream generated using the manifest and the new video fragments.

* * * * *